United States Patent
Griffith, Jr. et al.

(10) Patent No.: US 7,417,086 B2
(45) Date of Patent: Aug. 26, 2008

(54) COATING COMPOSITIONS

(75) Inventors: William Bryan Griffith, Jr., North Wales, PA (US); Mark Robert Winkle, Lansdale, PA (US)

(73) Assignee: Rohm and Haas Company, Philadelphia, PA (US)

(*) Notice: Subject to any disclaimer, the term of this patent is extended or adjusted under 35 U.S.C. 154(b) by 416 days.

(21) Appl. No.: 10/998,412

(22) Filed: Nov. 29, 2004

(65) Prior Publication Data
US 2006/0116453 A1    Jun. 1, 2006

(51) Int. Cl.
*C08K 5/5317* (2006.01)

(52) U.S. Cl. .................. 524/131; 524/321; 524/414; 526/193; 526/215; 526/233; 526/340.1

(58) Field of Classification Search ............... 526/193, 526/215, 233, 340.1; 524/131, 321
See application file for complete search history.

(56) References Cited

U.S. PATENT DOCUMENTS

| | | | |
|---|---|---|---|
| 3,556,968 A | | 1/1971 | Vittorio |
| 4,286,076 A | | 8/1981 | Davis et al. |
| 4,824,886 A | * | 4/1989 | Schmidt et al. ............ 524/131 |
| 5,264,482 A | | 11/1993 | Taylor et al. |
| 5,405,913 A | * | 4/1995 | Harwood et al. ............ 525/245 |
| 5,547,766 A | | 8/1996 | Gobran |
| 5,695,837 A | | 12/1997 | Everaerts et al. |
| 6,254,985 B1 | | 7/2001 | Gerst et al. |
| 6,773,746 B1 | * | 8/2004 | Bell .......................... 427/154 |
| 7,262,256 B2 | | 8/2007 | Date et al. |
| 2002/0082319 A1 | | 6/2002 | Zhao et al. |
| 2002/0120025 A1 | | 8/2002 | Balk |

FOREIGN PATENT DOCUMENTS

| | | |
|---|---|---|
| CA | 2074034 | 1/1993 |
| CN | 1263920 | 10/2003 |
| DE | 19810053 | 3/1998 |
| EP | 0343831 | 11/1989 |
| EP | 0348565 | 3/1990 |
| EP | 0 556 668 | 8/1993 |
| EP | 0 688 816 | 12/1995 |
| JP | 55-071758 | 5/1980 |
| JP | 55-71758 | * 5/1980 |
| JP | 56-104976 | 10/1981 |
| JP | 62007780 | 1/1987 |
| JP | 63-006065 | 1/1988 |
| WO | WO 93/12183 | 6/1993 |

OTHER PUBLICATIONS

Ullmann's Encyclopedia of Industrial Chemistry, vol. A21, p. 169, VCH publishers, 1992 (attached).
R. Baumstark and M. Schwatz, "Dispersionen fur Bautenfarben" p. 21, published by Vincentz Verlag, 2001 (original is attached; also, translation is attached).
Nergis Arsu, R., Stephen Davidson, and Richard Holman, "Factor Affecting The Photoyellowing Which Occuts During The Photoinitiated Polymerization Of Acrylates" Journal of Photochemistry and Photobiology A: Chemistry 87(1995) p. 169-175.
Anonymous, "Hartex(R) 101: Low Ammonia Natural Latex," published by Firestone Company, www.firesyn.com/latex.htm , 2003.
US 5,714,527, 02/1998, Jilek et al. (withdrawn)

* cited by examiner

*Primary Examiner*—Peter Szekely
(74) *Attorney, Agent, or Firm*—Carl P. Hemenway

(57) ABSTRACT

Aqueous polymer compositions are provided that are suitable as coatings when dry. The coatings formed from such compositions have desirably low level of yellowness, both when new and upon aging. Also provided are methods of making such compositions.

20 Claims, No Drawings

COATING COMPOSITIONS

BACKGROUND

It is often desired to provide a coating, film, or film layer with good optical properties. Some desired optical properties are, for example, clarity, lack of haze, and lack of color. One particularly desirable optical property is relatively low level of yellowness, and it is often desired that the relatively low level of yellowness be maintained upon aging of the coating. Sometimes, the good optical properties are desired because the coating will be applied to a substrate, and it is desired that the appearance of the substrate be altered as little as possible by the presence of the coating. Sometimes, multiple layers of the coating and substrate will be stacked on top of each other, for example when a coated substrate is wound into a roll, and it is desired that the stack thus formed has good optical properties.

US 2002/0082319 discloses 2-stage emulsion polymers made with sodium-based emulsifier, initiator, buffer, and neutralizer, in compositions that also contain low levels of ethylenediametetraacetic acid (EDTA).

The problem faced by the inventors is the provision of aqueous polymer compositions that, when dry, are useful as coatings, have less yellowness than previously known compositions, and maintain their low level of yellowness upon aging. We have found that this problem can be solved by providing aqueous polymer compositions that exclude all or nearly all ammonia compounds from the composition and that include a sufficient amount of at least one coordinating agent in the composition.

STATEMENT OF THE INVENTION

In a first aspect of the present invention, there is provided a method of making an aqueous composition, suitable when dry as a coating, comprising
  (a) providing at least one aqueous polymer that is made by polymerization of least one ethylenically unsaturated monomer and that has a glass transition temperature from −80° C. to 110° C., and
  (b) adding at least 10 ppm of at least one coordinating agent, by weight based on the dry weight of said at least one polymer,
wherein said aqueous composition contains 0 to 100 ppm ammonia compound, by weight based on the dry weight of said at least one polymer.

In a second aspect of the present invention, there is provided a method of making an aqueous composition, suitable when dry as a coating, comprising
  (a) providing at least one aqueous polymer that is made by polymerization of least one ethylenically unsaturated monomer and that has a glass transition temperature from −80° C. to 110° C., and
  (b) adding at least 10 ppm of at least one coordinating agent, by weight based on the dry weight of said at least one polymer,
wherein no ingredient used in said making of said aqeuous composition is an ammonia compound.

In a third aspect of the present invention, there is provided an aqueous composition, suitable for use when dry as a coating, comprising
  (a) at least one aqueous polymer that is made by polymerization of at least one ethylenically unsaturated monomer and that has a glass transition temperature from −80° C. to 110° C.,
  (b) at least 10 ppm of at least one coordinating agent, by weight based on the dry weight of said at least one polymer, and
  (c) 0 to 100 ppm ammonia compound, by weight based on the dry weight of said at least one polymer.

DETAILED DESCRIPTION

A coating, as used herein, is one or more layers of material applied to a substrate. The coating may have any of several purposes, including, for example, protecting the substrate, decorating the substrate, adhering two or more substrates together, sealing the substrate, filling cracks in the substrate, other purposes, or combinations thereof. A coating may be a continuous or discontinuous layer; a coating may be relatively thin or it may be relatively thick.

The practice of the present invention involves the use of aqueous polymers, which are polymer that are carried in an aqueous medium. By "carried in" is meant herein dissolved in, dispersed in, suspended in, otherwise borne in, or any combination thereof. The aqueous medium is a fluid that is normally at least 50% water by weight, based on the weight of the medium, or at least 75% water, or at least 90% water. In some embodiments, aqueous polymer is made in an aqueous medium by solution polymerization, suspension polymerization, emulsion polymerization, or a combination thereof. In some embodiments, the aqueous polymer is produced outside of an aqueous medium (for example, by solution polymerization in a non-aqueous solvent or by bulk polymerization) and is then combined with an aqueous medium to form an aqueous polymer.

In some embodiments, the aqueous polymer is made by aqueous emulsion polymerization, which is known in the art, for example as described by M. S. El-Aasser and E. D. Sudol in Chapter 2 of *Emulsion Polymerization and Emulsion Polymers*, edited by P. A. Lovell and M. S. El-Aasser, published by John Wiley and Sons, 1997. Aqueous emulsion polymerization involves forming an emulsion of monomer droplets in an aqueous medium (i.e., "emulsifying" the monomer) in a reaction vessel, usually stabilized by the presence of at least one surfactant. The monomers used in aqueous emulsion polymerization are compounds capable of participating in a free-radical polymerization. Monomer droplets may contain a single monomer or a mixture of monomers.

In most aqueous emulsion polymerization processes, one or more initiators are used. Intiators are compounds that are thought to produce free radicals in response to some stimulus, such as, for example, elevated temperature, chemical reaction, or radiation (such as, for example, photons, electrons, gamma rays, or a combination thereof). Some common initiators are persulfate salts. Other common initiators are organic and inorganic peroxides. The free radical produced by the initiator is thought to start a free-radical polymerization of monomer molecules to form polymers.

Normally, in aqueous emulsion polymerization, the polymers grow in particles separate from the monomer droplets. The resulting polymer particles desirably form a stable suspension in water, which is called a "latex." The polymer particles in a latex are called "latex particles."

Many variations of emulsion polymerization are practiced in the art. Any such variations and combinations thereof are contemplated in the practice of the present invention. For example, all of the monomer may be present at the beginning of the polymerization, or it may be added gradually or in steps after some of the polymerization has taken place. Polymerization may be conducted in a batch, semi-batch, or continuous process. Some emulsion polymerization is conducted in multiple "stages": that is, in each stage, one monomer composition is polymerized, and then in the next stage another monomer composition, which may be the same or different, is added and polymerized. Some emulsion polymerization is conducted in a single stage.

In the practice of emulsion polymerization, monomer (i.e., a pure monomer, mixture of monomers, or combination thereof) may be added to the reaction vessel before or during polymerization. Monomer may be emulsified in the reaction vessel, or it may be emulsified separately and then added as an emulsion to the reaction vessel. Monomer or portions thereof may be added relatively quickly, in one or more batches, or it may be added slowly or gradually, or it may be added in any combination of such methods. Initiator may be added before, during, or after addition of monomer. Surfactant may be added before, during, or after addition of monomer. If the emulsion polymerization is performed in multiple stages, any of the above methods of adding monomer may be used in any of the stages, and the method of monomer addition may be the same or different in the various stages.

Some common embodiments of aqueous emulsion polymerization involves use of at least one "seed." In such embodiments, a latex with relatively small latex particle size is prepared, and then a relatively small amount of that latex is added to a reaction vessel before the start of a fresh polymerization. Such a relatively small-particle-size latex is known as a "seed," because it is believed that such latex particles become the location of polymer growth during the fresh polymerization.

Sometimes, after aqueous emulsion polymerization takes place, a relatively small amount of monomer remains unreacted. In such cases, some extra initiator (called a "chaser") may be added to the reaction vessel to cause the unreacted monomer to polymerize; this procedure is called a "chase." One or more chases may be performed in between stages, if the polymerization involves more than one stage. Independently, one or more chases may be performed at the end of the polymerization process.

In embodiments of the present invention that involve emulsion polymerization, it is contemplated that any variation of emulsion polymerization, including those described above, and including any combination of variations, may be used. For example, any monomer addition method may be used; any number of stages may be used; a seed polymer may or may not be used; a chase may or may not be used. If multiple stages are used, the variation of emulsion polymerization used in any stage may be the same as or may be different from the variation of emulsion polymerization used in any other stage. If multiple stages are used, the monomer or mixture of monomers used in any stage may be the same as or may be different from the monomer or mixture of monomers used in any other stage.

Independently, some common embodiments of aqueous emulsion polymerization involve neutralization of the latex. For example, some emulsion polymerizations are conducted under conditions where the pH is 7 or less. Sometimes, it is desirable to raise the pH to a value above 7; this raising is usually performed by adding a water-soluble base until the desired pH is reached.

In the practice of the present invention, all or nearly all of the ingredients that are used are chosen to be compounds other than ammonia compounds. "Ammonia compound," as used herein, is defined as ammonia, any compound containing an ammonium ion, any primary amine, or any secondary amine. "Ammonia compound," as used herein, does not include tertiary amines.

In some embodiments, the aqueous composition of the present invention contains no or nearly no ammonia compounds. That is, the amount of ammonia compounds is none or nearly none. In some embodiments with nearly no ammonia compounds, the amount of ammonia compounds is 50 ppm or less of ammonia compounds by weight based on the solid weight of polymer in the aqueous composition; in other embodiments, the amount is 25 ppm or less; or 10 ppm or less. In some embodiments, there is no ammounia compound in the aqueous composition.

When ammonia compound is present as a salt or as a mixture of a salt and the corresponding neutral compound, the amount of ammonia compound is reported herein as the weight of the neutral compound. For example, ammonia dissolved in water is sometimes described as a solution of ammonium ions and hydroxide ions; in this case, the amount of ammonia in the solution is considered herein to be the weight of neutral ammonia compound.

In the practice of the present invention, one or more surfactants may be used, for example during emulsion polymerization. Some emulsion polymerization embodiments use surfactants that are salts of carboxylic acids or sulfonic acids; all or nearly all of such surfactants would be chosen as salts other than the ammonium salts; instead, the sodium, potassium, or other metal salt would be used.

In the practice of the present invention, one or more initiators are sometimes used for the aqueous emulsion polymerization; when one or more initiators are used, all or nearly all of the initiators that are used will be compounds that are not ammonia compounds. For example, no or nearly no ammonium persulfate would be used; instead, if a persulfate salt or salts are desired, any persulfate salt or salts used would be chosen from metal salts of persulfate, such as, for example, alkali metal salts of persulfate, such as, for example, sodium persulfate or potassium persulfate. For another example, one or more peroxides, such as, for example, an organic peroxide that is not an ammonia compound would be chosen as one or more of the initiator or initiators.

In the practice of the present invention, if the latex is neutralized, the compound or compounds used to adjust the pH will be all or nearly all chosen from compounds other than ammonia compounds. For example, if the neutralization process raises the pH of the latex, the base compound used could be, for example, all or nearly all composed of one or more basic metal salts such as, for example, sodium hydroxide, postassium hydroxide, or mixtures thereof.

In some embodiments of the present invention, one or more buffers are used in the aqueous composition, sometimes as part of the emulsion polymerization process. When one or more buffers are used, the buffer or buffers will be chosen so that the final aqueous composition contains no or nearly no ammonia coumpounds. In some embodiments, each buffer that is used will be a compound that is not an ammonia compound.

The process of making the aqueous composition of the present invention includes the use of various ingredients for various purposes, sometimes including one or more of the ingredients mentioned herein above, sometimes including one or more other ingredients, sometimes including a combination thereof. In the practice of the present invention, it is contemplated that each ingredient may be chosen such that the ingredient is not an ammonia compound. Contemplated are embodiments in which the ingredients are chosen such that any particular ingredient is a compound that is not an ammonia compound. Also contemplated are embodiments in which any combination of ingredients is chosen such that each ingredient in that combination is not an ammonia compound. Further contemplated are embodiments in which all ingredients are compounds that are not ammonia compounds.

In the practice of the present invention, polymerization is performed on at least one ethylenically unsaturated monomer. Suitable monomers are ethylenically unsaturated compounds capable of forming polymers via emulsion polymerization. Suitable monomers include, for example, unsaturated non-aromatic hydrocarbons such as dienes, styrenes, other aromatic monomers, (meth)acrylic monomers, and other vinyl monomers. "Styrenes," as used herein, means styrene and derivatives of styrene such as, for example, alphamethyl styrene. "(Meth)acrylic monomers," as used herein, means any of acrylic acid, methacrylic acid, esters thereof, and derivatives thereof. "(Meth)acrylate," as used herein, means acrylate or methacrylate. Some suitable (meth)acrylic monomers are, for example, alkyl (meth)acrylate esters, hydroxyalkyl (meth)acrylate esters, and (meth)acrylonitrile. Also suitable are (meth)acrylate esters with additional functional groups such as, for example, hydroxyl or additional vinyl groups. Some other suitable vinyl monomers include, for example, vinyl compounds such as, for example, vinyl chloride, vinyl acetate, and vinyl sulfate. Mixtures of suitable monomers are also suitable.

Some suitable alkyl (meth)acrylate esters are, for example, those with alkyl groups of 20 or fewer carbons. For example, some suitable alkyl (meth)acrylate monomers are methyl (meth)acrylate, ethyl (meth)acrylate, n-butyl (meth)acrylate, t-butyl (meth)acrylate, 2-ethylhexyl (meth)acrylate, iso-octyl (meth)acrylate, laurel (meth)acrylate, stearyl (meth)acrylate, and mixtures thereof.

In some embodiments of the present invention, the polymer or polymers are made from monomer mixtures that exclude all dienes. Independently, some embodiments use monomer mixtures that exclude all acrylonitrile; some embodiments use monomer mixtures that exclude methacrylonitrile. Some embodiments of the present invention use monomer mixtures that exclude any combination of dienes, acrylonitrile, and methacrylonitrile.

Independently, some embodiments involve at least one polymer made from a monomer mixture that includes at least one acrylate monomer; such polymers will be called "acrylate-containing polymers" herein. In some acrylate-containing polymers, the monomer mixture from which the polymer is made also contains at least one methacrylate monomer. Independently, in some acrylate-containing polymers, the monomer mixture from which the polymer is made also contains acrylic acid or methacrylic acid or a mixture thereof. Some acrylate-containing polymers are made from monomer mixtures that contain 1% to 99% acrylate monomers; 0 to 75% methacrylate monomers; 0 to 5% acrylic acid; and 0 to 5% methacrylic acid; by weight based on the total weight of all monomers.

The polymers that result from emulsion polymerization are latex polymers. The combination of water and the latex polymer particles suspended therein is known as a latex. Normally, a latex is 25% to 90% water by weight and 10% to 75% polymer solids by weight, based on the total weight of the latex. Independently, latex polymer particles normally have an average particle size of 10 nm to 2,000 nm. Latex polymer particles may be spherical, oblong, irregular, or a combination thereof.

The polymers of the present invention have glass transition temperatures of −80° C. to 110° C. Glass transition temperature (Tg) is measured by the midpoint method using differential scanning calorimetery. In some embodiments, the polymer will have only one Tg. Also contemplated are embodiments with multiple glass transition temperatures, such as, for example, blends of polymers, multi-phase copolymers, other arrangements of polymers that show multiple glass transition temperatures, and combinations thereof.

The polymers of the present invention may have any of a wide variety of weight-average molecular weight (Mw), as measured by size exclusion chromatography (SEC). In some embodiments, the aqueous composition contains at least one polymer that has Mw of 30,000 or more; in other embodiments, the at least one polymer has Mw of 50,000 or more, or 100,000 or more, or 200,000 or more, or 500,000 or more. Independent of molecular weight, the polymer of the present invention may be linear, branched, partially or fully crosslinked, star-shaped, block polymer, random polymer, or any combination therof. In some embodiments, the polymer of the present invention may be completely non-crosslinked. It is also contemplated that some portion or all of the polymer of the present invention may be gelled or crosslinked; it is anticipated that the gelled and/or crosslinked protion will not be measureable by SEC.

In some embodiments of the present invention that contain nearly no ammonia compounds, the small amount of ammonia that is present is introduced with one or more ingredients. For example, a relatively small amount of ammounia may be introduced with a seed polymer; that is, the seed polymer may have been made using an ammonia compound such as, for example, ammonium persulfate initiator; normally, when ammonia compound is introduced with a seed polymer, the amount introduced is 10 ppm or less by weight of ammonia compound based on the total dry weight of polymer in the aqueous composition. For another example, the aqueous composition of the present invention may be thickened with a thickener composition that contains some ammonia; normally, when ammonia compound is introduced with a thickener, the amount introduced is 1 ppm or less by weight of ammonia compound based on the total dry weight of polymer in the aqueous composition. For a third example, both a seed and a thickener may be the source of ammonia. In the practice of the present invention, in these examples or in other embodiments, the amount of ammonia compound introduced into the aqueous composition from seed and thickener combined is 20 ppm or less, or 10 ppm or less, by weight of ammonia compound based on the dry weight of polymer in the aqueous composition.

The aqeuous compositions of the present invention include at least one coordinating agent. A coordinating agent is a compound capable of forming one or more coordinate links with metal atoms. A coordinating agent capable of forming two or more coordinate links with metal ions is known as a chelating agent. Some embodiments of the present invention involve the use of chelating agents. Some suitable coordinating agents are described by Winkle in EP0688816.

Some suitable coordinating agents include, for example, phosphoric acid, phosphates and polyphosphates. Specific examples include, for example, phosphoric acid, phosphate, pyrophosphate, tripolyphosphate, hexametaphosphate, tetrametaphosphate, pentametaphosphate, and alkali metal salts thereof. Other suitable coordinating agents include, for example, n-phosphonoalkyl-n-carboxylic acids, such as, for example, phosphonoacetic acid, 2-phosphonobutane-1,2,4-tricarboxylic acid, 2-hydroxy-2-phosphonoacetic acid, and alkali metal salts thereof. Other suitable coordinating agents include, for example, gem-diphosphonoalkanes and gem-diphosphonohydroxyalkanes, such as, for example, methylenediphosphonic acid, 1-hydroxyethylidene-1,1-diphosphonic acid, and alkali metal salts thereof.

One other group of suitable coordinating agents is the group of compounds containing one or more tertiary aminedi(methylenephosphonic acid) moieties, which are moieties of the formula

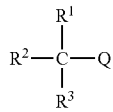

wherein —R¹, —R², and —R³, are, independently, either hydrogens or organic radicals, including alkyl radicals and substituted organic radicals, such as, for example, hydroxy alkyl radicals, and including structures that join two or more of R¹, R², and R³ into one or more cyclic structures; and wherein -Q is —N(CH$_2$PO$_3$X$_2$)$_2$, wherein each X is, independently, hydrogen or an alkali metal. Specific examples of such compounds include, aminotris(methylenephosphonic acid), ethylenediaminetetrakis(methylenephosphonic acid), diethylenetriamine-N,N,N',N'',N''-penta(methylene phosphonic acid), and alkali metal salts thereof.

Additional suitable coordinating agents include, for example, compounds soluble in water that have two or more pendant phosphate monoester moieties; some examples of such compounds are prepared by functionalizing a polymer to contain such pendant phosphate monoester moieties; others are prepared by by preparing polymers having, as polymerized units, phosphate monoester-containing monomers, such as, for example, phosphoethylmethacrylate, vinylphosphonic acid and allylphosphonic acid. Other suitable coordinating agents include, for example, compounds containing one or more tertiary aminedi(methylenecarboxylic acid) moieties, which are moieties of the formula

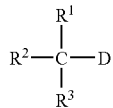

wherein —R¹, —R², and —R³, are defined as herein above, and -D is —N(CH$_2$CO$_2$X)$_2$, and wherein each X is, independently, hydrogen or an alkali metal. Specific examples of such compounds include N-(2-hydroxyethyl)ethylenediaminetriacetic acid, ethylenediaminetetraacetic acid, nitrilotris(methylenecarboxylic acid), and alkali metal salts thereof. When a coordinating agent has more than one acid group per molecule, it is to be understood that "alkali metal salt thereof" includes compounds in which the alkali metal salt is formed from one acid group; compounds in which the alkali metal salt is formed from more than one acid group; and mixtures and combinations thereof. In some embodiments, the alkali metal salts are sodium salts.

Mixtures of suitable coordinating agents are also suitable coordinating agents.

In some embodiments, the coordinating agent or agents are present at a level such that the weight of all coordinating agents is 10 ppm or greater, based on the dry weight of polymer. In other embodiments the weight of coordinating agent(s) is 25 ppm or greater; or 50 ppm or greater; or 100 ppm or greater; or 250 ppm or greater; or 500 ppm or greater; or 1,000 ppm or greater; based on the dry weight of polymer. Independently, in some embodiments the weight of coordinating agents is 20,000 ppm or less; or 10,000 ppm or less; or 5,000 ppm or less; or 2,000 ppm or less; based on the dry weight of polymer.

While the present invention is not limited to any particular mechanism, it is believed that some coatings are prone to have yellow color, or to develop yellow color upon aging, because of the presence of one or more metal-containing compounds, which may be, for example, pure or alloyed metal, metal oxides, metal salts, or a mixture thereof. Metals thought to commonly promote development of undesirable color in coatings include, for example, iron and copper. Metals other than alkali metals are thought to be more effective than alkali metals at promoting development of undesirable color.

For example, if an iron-containing compound is present in the composition of the present invention, it may be introduced into the composition from a variety of sources. It might be introduced intentionally, for example, in a catalyst or as part of an oxidation/reduction system during the preparation of the polymer. The iron-containing compound may also be introduced, for example, from the plumbing or the reaction vessel used in the production, transportation, or storage of the polymer, of other ingredients in the composition, or of the complete composition. The iron-containing compound may also be introduced into the composition, for example, as a contaminant in one or more of the raw materials. The iron-containing compound may also be introduced into the composition from the substrate onto which the polymer is applied, or from the optional at least one pigment. When iron-containing compounds are present in the composition of the present invention, they are sometimes found at a level of 1 ppm or more by weight, based on the dry weight of the polymer, and sometimes at a level of 2 ppm or more. Independently, iron-containing compounds are sometimes present in the composition of the present invention at a level of 10,000 ppm or less by weight, based on the dry weight of the polymer, and sometimes at a level of 5,000 ppm or less.

In some embodiments of the present invention, the aqueous composition of the present invention will include some non-alkali metal atoms, for example iron atoms that were introduced as part of an initiator during emulsion polymerization. In some of such embodimets, the at least one coordinating agent is present in an amount sufficient to provide a molar excess of coordinating agent over non-alkali metal atoms; for example the molar ratio of coordinating agent to non-alkali metal atoms is at least 1:1, or at least 2:1, or at least 3:1, or at least 5:1, or at least 10:1. In embodiments that have a molar excess of coordinating agent over non-alkali metal atoms, it is thought that the excess coordinating agent is capable of interacting with any non-alkali metal atoms that may be introduced to the composition (for example, from pipes or tanks), thus preventing development of undesirable color.

In some embodiments, the composition of the present invention contains at least one "clarifying" coordinating agent (i.e., a coordinating agent that reduces the absorbance in the visible spectrum of a composition containing a non-alkali metal). A coordinating agent can be identified as a clarifying coordinating agent by adding it to a composition containing a non-alkali metal such as, for example, iron, and measuring a reduction in the absorbance in the visible spectrum; the composition in which the testing of the absorbance is performed may be a composition that is also useful as a coating, or the composition in which the testing of the absorbance is performed may be a test composition chosen to have an easily-measured absorbance spectrum. In some embodiments of the present invention, each coordinating agent used will be a clarifying coordinating agent. In some embodiments of the present invention, each coordinating agent used will not be a clarifying coordinating agent. In some embodiments of the present invention, a mixture of one or more clarifying coordinating agents and one or more other coordinating agents will be used.

In addition to the contemplated interaction between coordinating agents and non-alkali metal atoms, we have also discovered that the compositions of the present invention have surprisingly low levels of yellowness and are surprisingly good at resisting the onset of yellowness during aging, even in aqueous compositions where the amount of non-alkali metal appears to be low or zero.

The time at which the at least one coordinating agent is added is not critical to the present invention. The at least one coordinating agent may be added before polymerization, during polymerization, after polymerization, or a combination thereof. For example, the at least one coordinating agent can be introduced separately, introduced as a component of one or more of the components of the polymerization, or introduced as any combination thereof. In some embodiments, the at least one coordinating agent is introduced after polymerization of the polymer is complete. In some independent embodiments, the at least one coordinating agent is added while the pH is acidic. In one particular embodiment of the present invention, the emulsion polymerization is conducted at acidic pH, the at least one coordinating agent is added to the latex after the polymerization is complete, and the latex is then neutralized to a basic pH.

The compositions of the present invention may optionally contain additional ingredients, which are normally adjuvants added to improved the properties of the type of coating desired. Examples of such adjuvants include one or more of, for example, colorants, thickeners, coalescents, defoamers, tackifiers, pigments, fillers, wetting agents, surfactants, and dispersants. In the practice of the present invention, such additional ingredients will be chosen so that the aqueous composition will have no or nearly no ammonia compounds. In some embodiments that contain one or more such additional ingredients, the additional ingredients are chosen such that at least one of the additional ingredients is not an ammonia compound. For example, in some embodiments that contain a defoamer, the chosen defoamer is not an ammonia compound. In some embodiments, none of the additional ingredients is an ammonia compound.

The compositions of the present invention may be applied to one or more substrates by any of a wide variety of methods. In some suitable methods of applying, including, for example, painting, brushing, spraying, dipping, roll coating, calendering, slot coating, curtain coating, coating with a wire-wound rod, and wiping, the aqueous composition is applied to the substrate and then the aqueous medium is evaporated or allowed to evaporate. In other suitable methods of applying, the aqueous medium is separated from the remaining ingredients of the aqueous composition by, for example, spray drying or coagulation followed by drying, and the remaining ingredients are then applied to one or more substrates, usually in a process that involves heating of the remaining ingredients and applying the resulting melt to substrate. After application to substrate, the composition may or may not be subjected to further heating. Independently, after application to substrate, the composition may or may not undergo further chemical reaction, such as, for example, a curing or crosslinking reaction. It is anticipated that heating of the coating after application will be desirable if any or all of the following reasons apply to the particular type of coating contemplated: when speedy drying is desired; when further chemical reactions are expected and desired; and when some or all of the at least one polymer is a polymer with Tg above room temperature.

The aqueous composition of the present invention may be applied as a coating to any one or more of a wide variety of substrates. Substrates may be, for example, metal (such as, for example, iron, steel, or aluminum), wood, cementitious substances (such as, for example, concrete, mortar, or stucco), plastic (such as, for example, polyvinyl chloride, polystyrene, polycarbonate, polyester, polyolefin, or other plastic), mineral, fibrous (such as, for example, paper, nonwoven fabric, or woven fabric), cellulosic (such as, for example, cellulose diacetate), or any combination thereof. In some cases, one or more substrates will be relatively thick, such as, for example, a structural member of a building, such as, for example, a metal I-beam or a wooden post. In some cases, one or more substrates will be relatively thin, such as, for example, metal foil (such as, for example, aluminum foil), paper, cloth, cellulosic film, or plastic film (such as, for example polyester or polypropylene film).

One method of assessing the yellowness of a coating is to measure the "b" paramater of the CIE L*a*b color space. Increasing positive b values indicate increasing yellowness. The b parameter can be measured with any tristimulus colorimeter (also known as chroma meters). The b parameter and its meaning are known in the art, as described, for example, by Billmeyer and Saltzman in *Principles of Color Technology*, 2nd edition, John Wiley & Sons, 1981.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. Independently, if minimum values for a particular parameter are recited, for example, to be 1, 2, or 3, and if maximum values for that parameter are recited to be, for example, 8 and 9, then the following ranges are all contemplated: 1 to 8, 1 to 9, 2 to 8, 2 to 9, 3 to 8, and 3 to 9.

EXAMPLES

In each of the following examples, one of two different methods of neutralizing latexes was used:
(i) Ammonia: 1 to 1 mixture by weight of water and concentrated aqueous ammonia was added to the latex until pH reached 7.5.
(ii) NaOH: 5% by weight solution of sodium hydroxide in water was added to the latex until pH reached 7.5.

In the following examples, abbreviation "CA" refers to Dequest™ 2016, an aqueous solution with approximately 20.5% (1-hydroxyethylidene) diphosphonic acid, sodium salt, and 0-2% disodium phosphonate, available from Solutia, Inc.

In each of the following examples, one of three levels of CA was used: 0, 180 ppm of CA, or 365 ppm of CA, by weight based on the dry weight of polymer.

In each of the following examples, one of two levels of iron sulfate was added to the aqeuous composition. The amount of iron is reported as ppm by weight of iron atoms based on the weight of dry polymer. The levels used were either 0 or 6 ppm of iron.

In the following examples, yellowness of coatings was measured with a Minolta Color Meter CR-200 (herein, the "color meter"), as follows. The aqueous composition was coated onto polyester sheet (Mylar™ from DuPont Co.) of thickness 50.8 μm (2 mil) and dried in a forced draft oven at 105° C. for 3 minutes. Coatings were smooth, even, clean, and free of defects, with thickness of 38.1 μm (1.5 mil)±2.5 μm (0.1 mil). A second piece of polyester film is laminated onto the coating using a rubber roller. The resulting laminate is cut into 8 pieces, which are stacked on top of each other to make the test sample. The color meter was calibrated to a standard white plate in Yxy color space according to manufacturer's instructions, and then the b value of the test sample was measured and recorded as the "unaged" value of b. The test sample is then placed in a forced-draft oven at 150° C. for 15 minutes, removed from the oven, allowed to cool to room temperature, and the b value is measured again, this time recorded as the "aged" value of b.

As a control sample, a stack of 16 pieces of polyester film, without any coating, is also tested, both unaged and aged, in the color meter using the same method.

Example 1

Latex Polymer LP1

A latex polymer (LP1) was prepared in the following manner: 890 g of deionized water was charged to a kettle and heated to 89° C. Next, to the kettle was added a mixture of 0.9 g of sodium carbonate in 22 g of water, 4.0 g of sodium persulfate in 34 g of water, and 30 g of a 45% solids acrylic latex polymer with a 100 nanometer particle size plus 30 grams of a water rinse. After a five minute hold, a monomer emulsion mixture of 475 g water, 17.4 g sodium dodecyl benzene sulfonate (23%), 1000 g of butyl acrylate, 980 g of methyl methacrylate, and 20 g of acrylic acid was slowly added to the kettle over three and one-half hours along with a cofeed containing 1.0 g of sodium persulfate in 90 g of water, followed by a 33 gram water rinse. During the addition of the feeds, the kettle temperature was maintained at 86° C. Thirty minutes after completion of the feeds, the kettle was cooled to 60° C., and 16.7 g of a 0.15% solution of iron (II) sulfate was added, followed by two chases, each consisting of 1.2 g of t-butyl hydroperoxide in 5.6 g of water, and 0.72 g of sodium formaldehyde sulfoxylate in 13.3 g of water. Following addition of the second chaser, the kettle was cooled below 40° C.

Examples 2-5

Aqueous Compositions

The latex polymer LP1 was used to make the following example aqueous compositions.

| Example # | Neutralization | ppm CA | ppm Fe |
|---|---|---|---|
| 2 | NaOH | 180 | 0 |
| 3 | NaOH | 365 | 0 |
| 4 | NaOH | 180 | 6 |
| 5 | NaOH | 365 | 6 |

Examples CA-CE

Comparative Aqueous Compositions

The latex polymer LP1 was used to make the following comparative aqueous compositions:

| Comp. Ex # | Neutralization | ppm CA | ppm Fe |
|---|---|---|---|
| CA | ammonia | 0 | 0 |
| CB | ammonia | 180 | 0 |
| CC | ammonia | 365 | 0 |
| CD | NaOH | 0 | 0 |
| CE | NaOH | 0 | 6 |

Yellowness of Example and Comparative Aqueous Compositions

The b parameter of yellowness was measured as described above for the aqueous compositions described above. The results were as follows:

| Composition | unaged b | aged b |
|---|---|---|
| control (polyester film only) | 3.1 | 3.0 |
| CA | 3.6 | 10.4 |
| CB | 3.6 | 9.4 |
| CC | 3.6 | 9.8 |
| CD | 3.6 | 3.7 |
| CE | 3.7 | 3.8 |
| 2 | 3.4 | 3.6 |
| 3 | 3.5 | 3.6 |
| 4 | 3.4 | 3.6 |
| 5 | 3.3 | 3.5 |

Yellowness as a Result of Added Ammonia

The composition of Example 4 was tested again. Also, 100 ppm of ammonia was added to the composition of Example 4 by adding the appropriate amount of aqueous ammonia solution to the aqueous composition and then forming and testing the coating as described above. The b value of the sample with added ammonia was measured twice, and the average is reported here. The results were as follows:

| Added ammonia(ppm) | unaged b | aged b |
|---|---|---|
| 0 | 3.3 | 3.6 |
| 100 | 3.3 | 4.4 |

We claim:

1. A method of making an aqueous composition, suitable when dry as a coating, comprising
    (a) providing at least one aqueous polymer that has a glass transition temperature from −80° C. to 110° C., wherein said aqueous polymer is made by aqueous emulsion polymerization of a monomer mixture that excludes all dienes and that comprises 1% to 99% acrylate monomers, by weight based on the total weight of all monomers,
    (b) adding to said aqueous polymer at least 10 ppm of at least one coordinating agent, by weight based on the dry weight of said at least one polymer, and
    (c) raising the pH of said aqueous polymer from 7 or less to above 7, wherein said aqueous composition contains 0 to 100 ppm ammonia compound, by weight based on the dry weight of said at least one polymer.

2. The method of claim 1, wherein said at least one coordinating agent comprises a compound selected from the group consisting of: phosphoric acid, phosphate, pyrophosphate, tripolyphosphate, hexametaphosphate, tetrametaphosphate, pentametaphosphate, phosphonoacetic acid, 2-phosphonobutane-1,2,4-tricarboxylic acid, 2-hydroxy-2- phosphonoacetic acid, methylenediphosphonic acid, 1-hydroxyethylidene-1,1-diphosphonic acid, aminotris(methylenephosphonic acid), ethylenediaminetetrakis(methylenephosphonic acid), diethylenetriamine-N,N,N',N'',N''-penta(methylene phosphonic acid), N-(2-hydroxyethyl)ethylenediaminetriacetic acid, ethylenediaminetetraacetic acid, nitrilotris(methylenecarboxylic acid), alkali metal salts thereof, and mixtures thereof.

3. The method of claim 1, wherein the amount of said at least one coordinating agent is 50 ppm or more by weight, based on the dry weight of said at least one polymer.

4. The method of claim 1, wherein no ingredient used in said making of said aqueous composition is an ammonia compound.

5. The method of claim 1, wherein said aqueous polymer is made by polymerization of a mixture of monomers selected from the group consisting of 1% to 99% acrylate monomers, 0% to 75% methacrylate monomers, 0% to 5% acrylic acid, and 0% to 5% methacrylic acid, by weight based on the weight of all monomers.

6. The method of claim 1, wherein said coordinating agent comprises at least one chelating agent.

7. The method of claim 1, wherein the weight of said coordinating agent is 10 ppm or greater, based on the dry weight of polymer.

8. The method of claim 1, wherein said coordinating agent comprises at least one clarifying coordinating agent.

9. The method of claim 1, wherein all the initiators used in said polymerization are not ammonia compounds.

10. The method of claim 1, wherein the amount of said coordinating agent, by weight based on the dry weight of said at least one polymer, is 20,000 ppm or less.

11. The method of claim 5, wherein each of said acrylate monomers is an alkyl acrylate ester, and wherein each of said methacrylate monomers is an alkyl methacrylate ester.

12. An aqueous composition, suitable for use when dry as a coating, made by the method of claim 1, wherein said aqueous polymer is made by polymerization of a mixture of monomers selected from the group consisting of 1% to 99% acrylate monomers, 0% to 75% methacrylate monomers, 0% to 5% acrylic acid, and 0% to 5% methacrylic acid, by weight based on the weight of all monomers.

13. The composition of claim 12, wherein said coordinating agent is selected from the group consisting of: phosphoric acid, phosphate, pyrophosphate, tripolyphosphate, hexametaphosphate, tetrametaphosphate, pentametaphosphate, phosphonoacetic acid, 2-phosphonobutane-1,2,4-tricarboxylic acid, 2-hydroxy-2-phosphonoacetic acid, methylenediphosphonic acid, 1-hydroxyethylidene-1,1-diphosphonic acid, aminotris(methylenephosphonic acid), ethylenediaminetetrakis(methylenephosphonic acid), diethylenetriamine-N,N,N',N'',N''-penta(methylene phosphonic acid), N-(2-hydroxyethyl)ethylenediaminetriacetic acid, ethylenediaminetetraacetic acid, nitrilotris(methylenecarboxylic acid), alkali metal salts thereof, and mixtures thereof.

14. The composition of claim 12, wherein the amount of said at least one coordinating agent is 50 ppm or more by weight, based on the dry weight of said at least one polymer.

15. The composition claim 12, wherein all the initiators used in said polymerization are not ammonia compounds.

16. The composition claim 12, wherein no ingredient used in said making of said aqueous composition is an ammonia compound.

17. The composition of claim 12, wherein each of said acrylate monomers is an alkyl acrylate ester, and wherein each of said methacrylate monomers is an alkyl methacrylate ester.

18. An aqueous composition, suitable for use when dry as a coating, made by the method of claim 1, wherein the amount of said coordinating agent, by weight based on the dry weight of said at least one polymer, is 20,000 ppm or less.

19. The composition of claim 18, wherein the amount of said at least one coordinating agent is 50 ppm or more by weight, based on the dry weight of said at least one polymer.

20. The composition of claim 18, wherein each of said acrylate monomers is an alkyl acrylate ester, and wherein each of said methacrylate monomers is an alkyl methacrylate ester.

* * * * *